United States Patent
Tsunooka (10) Patent No.: US 6,557,524 B2
(45) Date of Patent: May 6, 2003

(54) NEGATIVE PRESSURE CONTROL APPARATUS AND METHOD OF INTERNAL COMBUSTION ENGINE

(75) Inventor: Takashi Tsunooka, Susono (JP)

(73) Assignee: Toyota Jidosha Kabushiki Kaisha, Toyoto (JP)

( * ) Notice: Subject to any disclaimer, the term of this patent is extended or adjusted under 35 U.S.C. 154(b) by 0 days.

(21) Appl. No.: 09/842,058

(22) Filed: Apr. 26, 2001

(65) Prior Publication Data

US 2001/0035159 A1 Nov. 1, 2001

(30) Foreign Application Priority Data

May 1, 2000 (JP) .......................................... 2000-132636

(51) Int. Cl.[7] ................................................ F02D 9/00
(52) U.S. Cl. .................. 123/399; 123/179.18; 123/350; 123/339.11; 123/339.16; 60/284
(58) Field of Search ............................ 123/399, 179.18, 123/339.16, 350, 339.11; 60/284

(56) References Cited

U.S. PATENT DOCUMENTS

| 5,398,544 A | * 3/1995 | Lipinski et al. .......... 73/118.25 |
| 5,588,409 A | * 12/1996 | Mizuno et al. ........ 123/339.11 |
| 5,845,486 A | * 12/1998 | Yamashita et al. .......... 123/247 |
| 5,846,164 A | 12/1998 | Harada |
| 5,915,357 A | 6/1999 | Harada et al. |
| 5,950,594 A | 9/1999 | Mizuno |
| 5,950,595 A | 9/1999 | Yoshioka et al. |
| 6,006,716 A | 12/1999 | Harada et al. |
| 6,017,100 A | 1/2000 | Mizuno et al. |
| 6,065,443 A | 5/2000 | Mizuno et al. |
| 6,095,116 A | 8/2000 | Matsushita et al. |

FOREIGN PATENT DOCUMENTS

JP     A 08-318764     12/1996

* cited by examiner

Primary Examiner—Tony M. Argenbright
Assistant Examiner—Johnny H. Hoang
(74) Attorney, Agent, or Firm—Oliff & Berridge, PLC (57) ABSTRACT

An apparatus and method control a negative pressure in an internal combustion engine equipped with a brake booster that uses a negative pressure produced on a downstream side of a throttle valve provided in an intake passage of the engine, as a power source for amplifying the pedal pressing force. A controller of the apparatus or method determines whether a negative pressure applied to the brake booster has reached a predetermined level when the internal combustion engine is started, and, if the negative pressure has not reached the predetermined level, increases an operating speed of the engine to a predetermined high speed and then keeps the throttle valve in a fully closed position during a period of time in which the engine proceeds to a steady-state operating mode.

34 Claims, 6 Drawing Sheets

NEGATIVE PRESSURE CONTROL APPARATUS AND METHOD OF INTERNAL COMBUSTION ENGINE

INCORPORATION BY REFERENCE

The disclosure of Japanese Patent Application No. 2000-132636 filed on May 1, 2000, including the specification, drawings and abstract, is incorporated herein by reference in its entirety.

BACKGROUND OF THE INVENTION

1. Field of Invention

This invention relates to an apparatus and method for controlling negative pressure in internal combustion engines, and more particularly to an apparatus and method for controlling negative pressure in an internal combustion engine provided with a brake booster that utilizes negative pressure generated on a downstream side of a throttle valve disposed in an intake air passage, as a power source for boosting or amplifying pedal pressing force that is applied to a brake pedal.

2. Description of the Related Art

An example of a known apparatus for controlling negative pressure in an internal combustion engine provided with a brake booster for amplifying a brake pressing force is disclosed in, for example, U.S. Pat. No. 6,095,116. The brake booster utilizes a negative pressure generated on a downstream side of a throttle valve disposed in an intake air passage, as a power source for boosting or amplifying a pedal pressing force that is applied by a driver to a brake pedal. If an insufficient negative pressure is supplied from the intake air passage, therefore, the brake booster cannot amplify the pedal pressing force in an appropriate manner.

In view of this situation, the known apparatus as disclosed in U.S. Pat. No. 6,095,116 is adapted to detect a negative pressure applied to the brake booster, and close the throttle valve by a predetermined degree or amount if the negative pressure has not reached a predetermined value. In this case, a large negative pressure is developed in the intake air passage on the downstream side of the throttle valve, and the thus increased negative pressure is applied to the brake booster. Thus, the known apparatus can surely provide a sufficiently large negative pressure to be applied to the brake booster, so that the pedal pressing force (i.e., the force applied to the brake pedal) can be appropriately boosted or amplified.

Upon a cold start of the internal combustion engine, the ignition timing may be retarded from the optimal timing in order to accelerate warm-up of a catalyst, and the like. If the ignition timing is retarded, the temperature of exhaust gas is likely to increase, whereas the output of the engine is reduced. In general, the output of the engine increases with increases in the amount of the air drawn into the engine and in the amount of fuel injected. Thus, in order to accelerate warm-up of the catalyst, and the like, while avoiding a reduction in the output of the engine, it is possible to increase the opening of the throttle valve disposed in the intake air passage while at the same time retarding the ignition timing.

If the opening of the throttle valve increases rapidly upon a cold start of the engine, a large negative pressure is not produced in the intake air passage on the downstream side of the throttle valve, and the negative pressure applied to the brake booster cannot be increased up to a desired or required level. In the above-described known apparatus, if the negative pressure applied to the brake booster fails to reach the desired level, the throttle valve is closed so as to increase the magnitude of the negative pressure. However, if the throttle valve is immediately closed every time the negative pressure applied to the brake booster becomes insufficient, the amount of air drawn into the engine is reduced, and the output of the engine cannot be increased as desired.

SUMMARY OF THE INVENTION

It is therefore an object of the invention to provide an apparatus and method for controlling negative pressure in an internal combustion engine, which is able to provide a sufficiently large negative pressure to be applied to a brake booster, without impeding or affecting the operation of the engine.

To accomplish the above and/or other objects, one aspect of the invention provides an apparatus for controlling a negative pressure in an internal combustion engine, comprising a brake booster and a controller. The brake booster amplifies a pedal pressing force that is applied to a brake pedal, by using a negative pressure produced on a downstream side of a throttle valve provided in an intake passage of the engine, as a power source for amplifying the pedal pressing force. The controller determines whether a negative pressure applied to the brake booster has reached a predetermined level when the internal combustion engine is started, and, if the negative pressure has not reached the predetermined level, increases an operating speed of the engine to a predetermined high speed, and then keeps the throttle valve in a small opening state in which an opening amount of the throttle valve is smaller than that established when the internal combustion engine is in a fast idle state, during a period of time in which the engine proceeds to a steady-state operating mode.

In the apparatus as described above, the throttle valve may be kept in a fully closed position during the period of time in which the internal combustion engine proceeds to the steady-state operating mode. It is also possible to keep the opening amount of the throttle valve substantially equal to a throttle opening established during normal idling of the internal combustion engine, during the period of time in which the internal combustion engine proceeds to the steady-state operating mode.

In the apparatus as described above, the brake booster is adapted to amplify the pedal pressing force applied to the brake pedal using, as a power source, a negative pressure (hereinafter called "intake manifold pressure") produced on the downstream side of the throttle valve disposed in the intake air passage. The internal combustion engine can operate or revolve due to inertia without being supplied with the air, until the engine proceeds to the steady-state operating mode after its speed reaches the predetermined high speed. During this self-operating period, the throttle valve can be suitably maintained in the fully closed state without causing any problem to the operation of the engine.

In the apparatus of the invention as described above, if a negative pressure applied to the brake booster (which will be called "brake negative pressure") is less than a desired level at the time of the start of the engine, the throttle valve is kept in the fully closed state during the period of time in which the engine proceeds to the steady-state operating mode after its speed reaches the predetermined high speed. In this case, a large intake manifold pressure is produced in the intake air passage downstream of the throttle valve, so that the brake negative pressure is accordingly increased. According to the invention, therefore, it is possible to provide the brake booster with a sufficiently large negative pressure without affecting the operation of the internal combustion engine.

Another aspect of the invention involves a method of controlling negative pressure in an internal combustion engine as described above.

BRIEF DESCRIPTION OF THE DRAWINGS

This invention will be described in greater detail with reference to the accompanying drawings, in which like numerals are used to identify like elements and wherein.

DETAILED DESCRIPTION OF PREFERRED EMBODIMENTS

Figure 1:
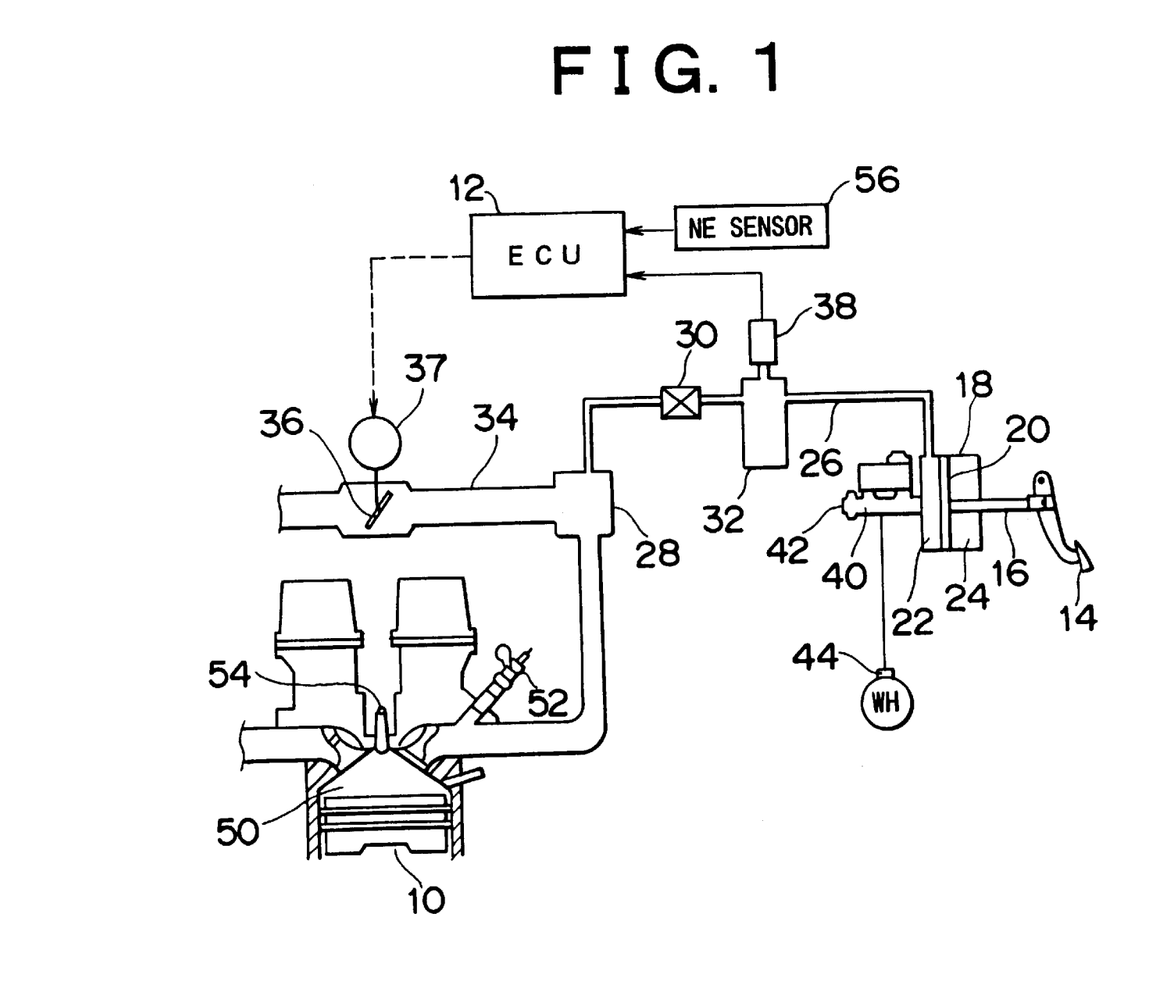
FIG. 1 is a view showing a system of a negative pressure control apparatus of an internal combustion engine according to a first embodiment of the invention.

FIG. 1 shows a system of a negative pressure control apparatus of an internal combustion engine 10 according to a first embodiment of the invention. The system according to this embodiment includes an electronic control unit (hereinafter referred to as the "ECU") 12, and is controlled by the ECU 12.

As shown in FIG. 1, the system of this embodiment includes a brake pedal 14. A brake booster 18 is connected via an operating shaft 16 to the brake pedal 14. The brake booster 18 has a negative pressure chamber 22 and a variable pressure chamber 24 formed therein and separated from each other by a diaphragm 20. A surge tank 28 of the engine 10 is connected via a negative-pressure feed pipe 26 to the negative pressure chamber 22.

A check valve 30 is provided midway (at a midway point of) the negative-pressure feed pipe 26. The check valve 30 is a one-way valve that only allows flow of the air from the negative pressure chamber 22 to the surge tank 28. The check valve 30 is opened when a pressure in the negative pressure chamber 22 is higher than that in the surge tank 28. A negative-pressure accumulation tank 32 is provided on a side of the check valve 30 that is closer to the negative pressure chamber 22. The negative-pressure accumulation tank 32 has the function of accumulating a negative pressure developed in the surge tank 28.

A throttle valve 36 for varying the effective area of the intake passage 34 is provided in a portion of the passage 34 located upstream of the surge tank 28. The throttle valve 36 is coupled to a throttle actuator 37 that is electrically connected to the ECU 12. When the throttle actuator 37 drives the throttle valve 36 according to a drive signal supplied from the ECU 12, the throttle valve 36 is opened or controlled to an opening amount that depends upon the driving condition of the actuator 37. The opening amount of the throttle valve 36 is hereinafter referred to as a throttle opening θ.

When the internal combustion engine 10 is in a running state, a negative pressure (which may also be called "intake manifold pressure") is produced in a portion of the intake air passage 34 located downstream of the throttle valve 36, which includes the surge tank 28. The intake manifold pressure produced in the surge tank 28 is introduced into the negative pressure chamber 22 of the brake booster 18 through the negative-pressure feed pipe 26 and the negative-pressure accumulation tank 32. Thus, the intake manifold pressure produced in the surge tank 28 is supplied to the negative pressure chamber 22 of the brake booster 18 while the internal combustion engine 10 is operating.

When the brake pedal 14 is not depressed, a negative pressure applied to the negative pressure chamber 22 (which will be referred to as "brake negative pressure $B_{VAC}$") is introduced into the variable pressure chamber 24 of the brake booster 18. In this case, there is no difference between the pressure in the variable pressure chamber 24 and the pressure in the negative pressure chamber 22. When the brake pedal 14 is depressed, on the other hand, the air, whose amount corresponds to a force applied to the brake pedal 14, is introduced into the variable pressure chamber 24. The force applied to the brake pedal 14 will be now referred to as "pedal pressing force". When the brake pedal 14 is depressed while the engine 10 is running, therefore, a pressure difference that corresponds to the pedal pressing force is created between the variable pressure chamber 24 and the negative pressure chamber 22. This pressure difference acts as assist force having a predetermined amplification ratio with respect to the pedal pressing force. When the brake pedal 14 is depressed while the internal combustion engine 10 is running, therefore, the brake booster 18 generates the assist force having a predetermined amplification ratio with respect to the pedal pressing force by using the intake manifold negative pressure produced in the surge tank 28 as a power source.

A pressure sensor 38 is provided in the negative pressure accumulation tank 32. The pressure sensor 38 generates a signal corresponding to an internal pressure of the negative pressure accumulation tank 32, namely, the internal pressure (brake negative pressure $B_{VAC}$) that is applied to the negative pressure chamber 22 of the brake booster 18. The output signal from the pressure sensor is supplied to the ECU 12. The ECU 12 detects the brake negative pressure $B_{VAC}$ based on the output signal from the pressure sensor 38.

A master cylinder 42, which has a hydraulic chamber 40 formed therein, is connected to the brake booster 18. A master cylinder pressure that corresponds to a sum of the pedal pressing force and the assist force is generated in the hydraulic chamber 40 of the master cylinder 42. A wheel cylinder 44 is connected to the master cylinder 42. The wheel cylinder 44 applies a braking force corresponding to the master cylinder pressure to vehicle wheels.

The internal combustion engine 10 includes an injector 52 disposed near an end portion of the intake air passage 34 on the side of a combustion chamber 50, and an ignition plug 54 disposed such that its distal end is exposed to the combustion chamber 50. When a drive signal is supplied from the ECU 12, the injector 52, which is electrically connected to the ECU 12, injects fuel that has been pumped from a fuel tank, into the intake air passage 34. The ignition plug 54, which is electrically connected to the ECU 12, generates a spark inside the combustion chamber 50 when a high-voltage ignition signal is supplied from the ECU 12 to the plug 54.

An NE sensor 56 that outputs a signal corresponding to the revolution speed of the internal combustion engine 10

(which will be referred to as the "engine speed NE") is connected to the ECU 12. The ECU 12 detects the engine speed NE based on the output signal from the NE sensor 56.

When the internal combustion engine 10 is started, the operation of the engine 10 may be caused to proceed to a fast idle state in which the engine 10 revolves at a higher speed than usual (for example, at a speed of 1,500 rpm; the engine speed NE in this fast idle state will be called "fast idle speed NEo"), in order to accelerate warm-up of the engine. The engine 10 may be caused to revolve at a high speed by various methods, for example, by increasing the amount of intake air supplied to the combustion chamber 50 and the amount of fuel injected into the intake air passage 34. This method makes it possible to increase the output of the engine 10 by encouraging combustion in the combustion chamber 50 of the internal combustion engine 10, thus enabling the engine 10 to operate at a high speed. The amount of intake air can be increased by increasing the opening amount of the throttle valve 36.

If, however, the opening amount of the throttle valve 36 is increased immediately after the internal combustion engine 10 is started so as to allow the engine 10 to proceed to the fast idle state, it becomes difficult to produce a large intake manifold pressure in the surge tank 28, or in a portion of the air passage 34 downstream of the throttle valve 36. If the brake pedal 14 is depressed in this situation, a desired pressure difference cannot be established between the variable pressure chamber 24 and the negative pressure chamber 22 of the brake booster 18, thus making it impossible to produce a desired assist force to be added to the pedal pressing force.

When the operating state of the engine 10 shifts from high-speed revolution to low-speed revolution, the engine 10 can revolve due to inertia even with only a small amount of air drawn into the combustion chamber 50. Thus, substantially no problem arises in the operation of the engine 10 even if the throttle valve 36 is held in a small opening state (in which, for example, the opening amount of the throttle valve 36 is held at around that of the valve 36 during normal idling, or the throttle valve 36 is held in a fully closed position as described later), during the period in which the engine speed is reduced from a high level to a low level. Accordingly, if the engine 10 is caused to race at a higher speed than the fast idle speed (for example, at a speed of 2,000 rpm; the engine speed NE in this high-speed operation state will be called "racing speed NEmax") immediately after the start of the engine 10, and then the throttle valve 36 is kept in the fully closed position for the subsequent period until the engine 10 reaches the fast idle state, a large intake manifold pressure, whose level is proportional to the period in which the throttle valve 36 is kept in the fully closed position, can be generated in the intake air passage 34 downstream of the throttle valve 36. If such a large intake manifold pressure is produced in the intake air passage 34, the negative pressure is fed to the negative pressure chamber 22 of the brake booster 18 through the negative-pressure feed pipe 26 and the negative-pressure accumulation tank 32, so that a desired assist force to be added to the pedal pressing force can be generated. Here, the "fully closed position" of the throttle valve 36 means the most closed position to which the throttle valve 36 can be driven by the throttle actuator 37 under control of the ECU 12. It is to be understood that a small amount of air may be drawn to or leak into the downstream side of the throttle valve 36 even when the valve 36 is placed in the "fully closed position". The fully closed position of the throttle valve 36 may correspond to a valve position that is established during normal idling of the engine 10. It is also to be understood that the opening amount of the throttle valve 36 when it is in the fully closed position is smaller than that of the throttle valve 36 established during fast idling of the engine 10.

The system according to the first embodiment is characterized in that, if the brake negative pressure $B_{VAC}$ has not reached a desired level when the internal combustion engine 10 is started, the engine 10 is caused to operate at the racing speed NEmax, which is higher than the fast idle speed NEo, and then the throttle valve 36 is kept in the fully closed position for the subsequent period until the engine 10 slows down to the fast idle speed NEo, thus assuring a sufficiently large brake negative pressure $B_{VAC}$ immediately after the start of the engine 10.

Figure 2A:
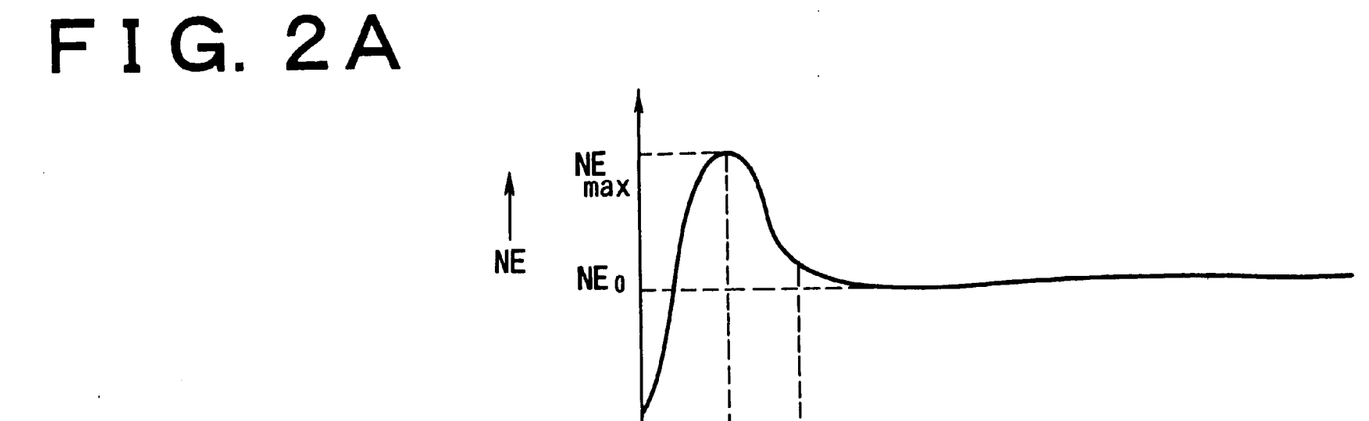
FIGS. 2A and 2B explain the operation of the negative pressure control apparatus of the engine according to the first embodiment.
Figure 2B:
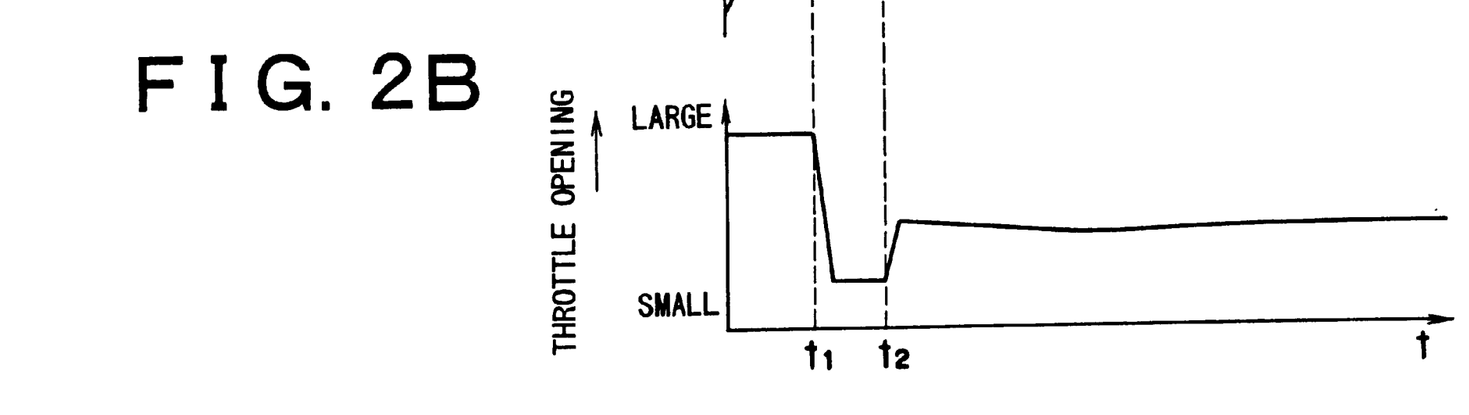

Referring to FIG. 2A and FIG. 2B, the operation of the negative pressure control apparatus of the engine 10 according to the first embodiment now will be explained. Here, FIG. 2A shows changes in the engine speed NE with time, while FIG. 2B shows changes in the throttle opening θ with time.

As shown in FIGS. 2A and 2B, immediately after the internal combustion engine 10 is started, the throttle opening θ is made large so that the engine speed is rapidly increased up to the racing speed NEmax that is higher than the fast idle speed (NEo). Once the engine speed NE reaches the predetermined racing speed NEmax at a point of time t=$t_1$, the throttle opening θ is changed so that the throttle valve 36 is fully closed. The throttle valve 36 is then kept in the fully closed position until the engine speed NE is reduced down to a predetermined value (at a point of time t=$t_2$ in FIGS. 2A and 2B). Since only a considerably small amount of air is drawn into the intake air passage 34 downstream of the throttle valve 36 while the throttle valve 36 is kept in the fully closed position, a large intake manifold pressure can be produced in the surge tank 28. When the engine speed NE reaches the predetermined level at time t=$t_2$, the throttle opening θ is increased so that the engine 10 is operated in the fast idle state (NEo).

Figure 3:
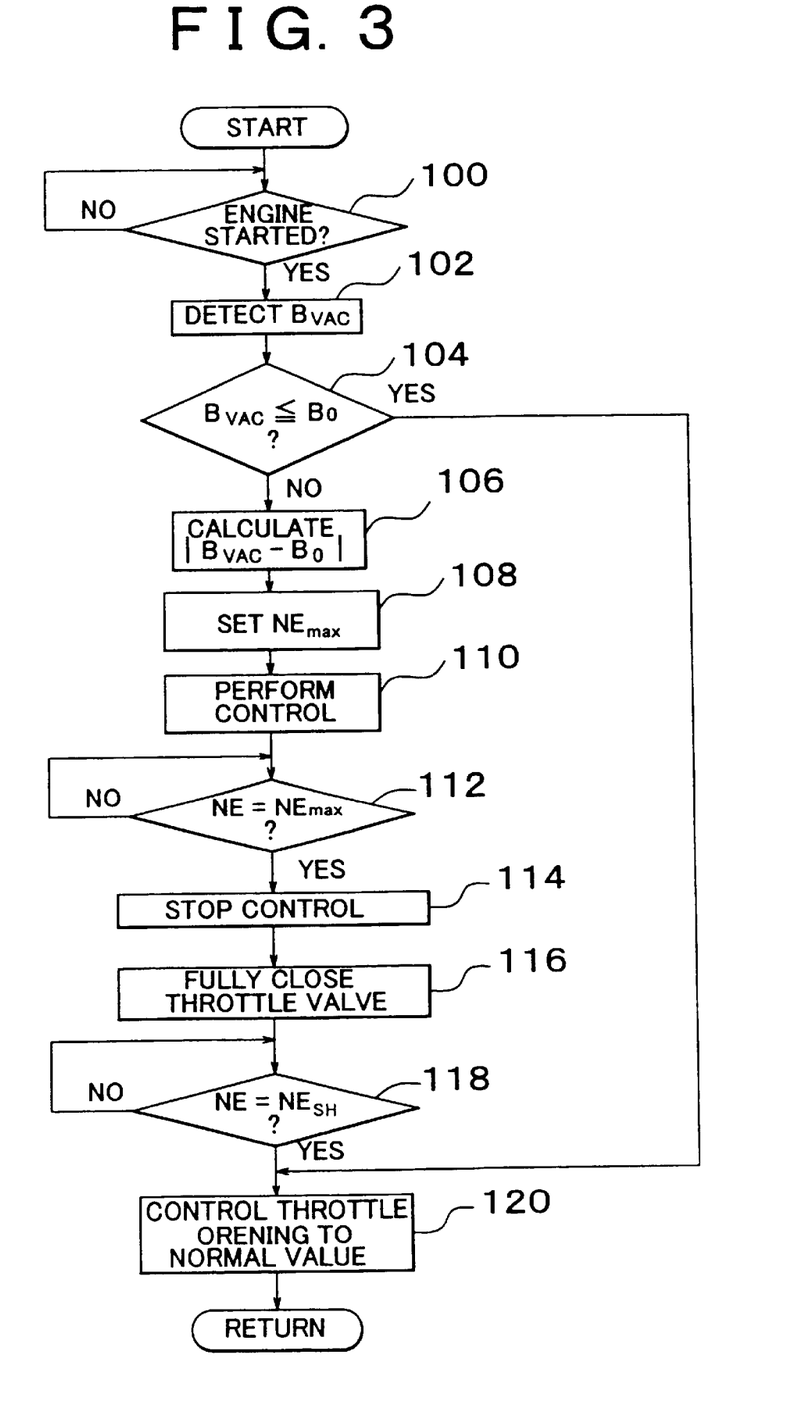
FIG. 3 is a flowchart showing a control routine executed by an ECU shown in FIG. 1.

FIG. 3 is a flowchart of one example of a control routine executed by the ECU in this embodiment so as to accomplish the above-described functions. The routine as shown in FIG. 3 is started each time its process is finished. When the routine as shown in FIG. 3 is started, step 100 is first executed.

In step 100, it is determined whether the internal combustion engine 10 has been started through an operation of an ignition switch. Step 100 is repeatedly executed until the above condition is satisfied. When step 100 determines that the engine 10 has been started, step 102 is then executed.

In step 102, the pressure applied to the negative pressure chamber 22 of the brake booster 18, namely, the brake negative pressure $B_{VAC}$, is detected based on an output signal of the pressure sensor 38.

In step 104, it is determined whether the brake negative pressure $B_{VAC}$ detected in the above step 102 is equal to or less than a predetermined value Bo. The predetermined value Bo is the minimum brake negative pressure $B_{VAC}$ with which the brake booster 18 can be judged as being able to produce assist force having a desired amplification ratio with respect to the pedal pressing force (i.e., the force applied to the brake pedal 14). If $B_{VAC} \leq Bo$ is satisfied, it can be determined that a sufficiently large negative pressure acts on the negative pressure chamber 22 of the brake booster 18 and that the brake booster 18 can produce assist force having a desired amplification ratio with respect to the pedal pressing force. In this case, there is no need to apply an even larger negative pressure to the negative pressure chamber 22. When it is determined that $B_{VAC} \leq Bo$ is satisfied, therefore, the process proceeds to step 120.

If $B_{VAC} \leq Bo$ is not satisfied, on the other hand, it is determined that a sufficiently large negative pressure is not acting on the negative pressure chamber 22 of the brake booster 18 and that the brake booster 18 is not able to produce assist force having a desired amplification ratio with respect to the pedal pressing force. In this case, it is necessary to apply a large negative pressure to the negative pressure chamber 22. If step 104 determines that $B_{VAC} \leq Bo$ is not satisfied, therefore, the control process proceeds to step 106.

In step 106, a difference $|B_{VAC}-Bo|$ between the actual brake negative pressure $B_{VAC}$ and the target predetermined value Bo is calculated.

If this difference $|B_{VAC}-Bo|$ is small, it is possible to surely reduce the brake negative pressure to the target predetermined value Bo even if the throttle valve 36 is kept in the fully closed position only for a short period of time. If, on the other hand, the difference $|B_{VAC}-Bo|$ is large, the brake negative pressure cannot be reduced down to the target predetermined value Bo unless the throttle valve 36 is kept in the fully closed position for a long period of time. In this respect, it is appropriate to set the period of time during which the throttle valve 36 is kept in the fully closed position to a value that depends upon or corresponds to the difference between the actual brake negative pressure $B_{VAC}$ and the target predetermined value Bo.

The higher the racing speed NEmax is compared to the fast idle speed NEo of the engine 10, the longer it takes the engine speed NE of the engine 10 to decrease down to the fast idle speed NEo after it reaches the racing speed NEmax. In this respect, it is possible to set the period of time during which the throttle valve 36 is kept in the fully closed position to a value that depends upon or corresponds to the difference between the actual brake negative pressure $B_{VAC}$ and the target predetermined value Bo by setting the racing speed NEmax to an appropriate value. To this end, step 106 as described above is followed by step 108.

In step 108, the racing speed NEmax of the internal combustion engine 10 is set to a value that depends upon the difference $|B_{VAC}-Bo|$ calculated in step 106. More specifically, the racing speed NEmax is set to a higher value as the difference $|B_{VAC}-Bo|$ is greater, by referring to a certain map stored in memory of the ECU 12, for example.

In step 110, a control operation is performed so as to open the throttle valve 36 by a large degree so that the racing speed NEmax set in the above step 108 can be realized after the engine 10 is started. Once step 110 is executed, a large amount of air is drawn into the combustion chamber 50 of the engine 10, and at the same time a large amount of fuel is injected.

In step 112, it is determined whether the engine speed NE has reached the racing speed NEmax. Step 112 is repeatedly executed until NE becomes equal to NEmax. When step 112 determines that NE is equal to NEmax, step 114 is then executed.

In step 114, the above control operation for opening the throttle valve 36 by a large degree is stopped.

Step 116 is then executed to perform an operation to place the throttle valve 36 in the fully closed position. Once step 116 is executed, only a considerably small amount of air is drawn or introduced into the intake air passage 34 on the downstream side of the throttle valve 36, and a large intake manifold pressure is produced.

In step 118, it is determined whether the engine speed NE has reached a threshold value NEsh or not. In other words, step 118 determines whether the internal combustion engine 10 has proceeded to a steady-state operating mode. Namely, the engine 10 is judged as having proceeded to the steady-state operating mode at a point of time when the engine speed NE has reached the threshold value NEsh. The threshold value NEsh is set to a value that is higher than the fast idle speed NEo and lower than the racing speed NEmax. Step 118 is repeatedly executed until NE=NEsh is satisfied. When step 118 determines that NE=NEsh is satisfied, step 120 is then executed. Thus, In step 120, the opening of the throttle valve 36 is controlled to a value with which the engine speed NE of the internal combustion engine 10 becomes substantially equal to the fast idle speed NEo. Upon execution of step 120, the engine 10 is caused to operate in the fast idle state. When the operation of step 120 is completed, the current cycle of this control routine is terminated.

According to the control process of FIG. 3 as described above, if the brake negative pressure $B_{VAC}$ does not reach a level sufficient to permit the brake booster 18 to produce an assist force having a desired amplification ratio with respect to the pedal pressing force when the engine 10 is started, the operating speed of the engine 10 is rapidly increased to a speed (i.e., racing speed) that is higher than the fast idle speed before the engine 10 proceeds to the fast idle state. Furthermore, after the engine speed NE reaches the racing speed, the throttle valve 36 is held in the fully closed position for a period of time during which the engine speed NE decreases down to the fast idle speed.

With the throttle valve 36 held in the fully closed position, the amount of air drawn or introduced into the combustion chamber 50 of the engine 10 is significantly reduced even while the engine 10 is operating, and therefore a large intake manifold pressure is developed in the intake air passage 34 on the downstream side of the throttle valve 36. The intake manifold pressure is applied to the negative pressure chamber 22 of the brake booster 18 via the negative-pressure feed pipe 26 and the negative-pressure accumulation tank 32. It is therefore possible to increase the brake negative pressure $B_{VAC}$ immediately after the engine 10 is started even when the brake negative pressure $B_{VAC}$ is insufficient, namely, is higher than the required level.

Furthermore, substantially no problem arises in the operation of the engine 10 even if the throttle valve 36 is held in the fully closed position during the period of time in which the engine speed NE of the engine 10, which has reached the racing speed, is decreased down to the fast idle speed. According to the first embodiment, therefore, a sufficiently large negative pressure can be developed in the brake booster 18 promptly after the engine 10 is started, without impeding or affecting the operation of the engine 10. Thus, the embodiment makes it possible to appropriately operate the brake booster 18 before the engine 10 proceeds to the fast idle state following its start, thus permitting the brake booster 18 to appropriately boost or amplify the force applied to the brake pedal 14.

According to the control process of FIG. 3 as described above, the racing speed to be reached after the start of the engine 10 can be set to a value that depends upon a deviation (i.e., an amount of shortage) of the brake negative pressure $B_{VAC}$ from its target value. More specifically, the greater the deviation (or the amount of shortage) of the brake negative pressure $B_{VAC}$ from the target value, the higher the racing speed. As the racing speed increases, the subsequent period of time before the engine 10 proceeds to the predetermined fast idle state is prolonged, and therefore the period of time in which the throttle valve 36 is kept in the fully closed position is prolonged. Namely, the period of time in which the throttle valve 36 is kept in the filly closed position increases with an increase in the deviation (i.e., an amount of shortage) of the brake negative pressure $B_{VAC}$ from the target value.

According to this embodiment, therefore, the intake manifold pressure can be introduced or applied to the negative pressure chamber 22 of the brake booster 18 in accordance with the deviation of the brake negative pressure $B_{VAC}$ from the target value. Thus, even if the brake negative pressure $B_{VAC}$ is largely short of the target or required level, a sufficiently large negative pressure can be surely developed in the brake booster 18 since the period of time in which the intake manifold pressure is applied to the negative pressure chamber 22 of the brake booster 18 is prolonged or increased in accordance with the deviation of the brake negative pressure $B_{VAC}$ from the target level.

In the above-described embodiment, the operating speed of the engine 10 is rapidly increased to the racing speed, which is higher than the fast idle speed, by increasing the throttle opening θ by a large degree immediately after the engine 10 is started. Instead, the ignition timing may be advanced so as to rapidly increase the engine speed to the racing speed. In this case too, combustion of an air-fuel mixture in the engine 10 is encouraged, thus permitting the engine 10 to produce a sufficiently high output.

A second embodiment of the invention will be explained.

Upon a cold start of the engine 10, the ignition timing of the engine 10 may be retarded in order to accelerate warm-up of a catalyst and other components. This control will be hereinafter called "ignition retard control". If the ignition timing is retarded, the temperature of exhaust gas increases more rapidly than it would under normal ignition timing control, so that the catalyst can readily warm up by heat transferred from the exhaust gas, though the output of the engine 10 is reduced. As a technique for compensating for the reduction in the output of the engine 10, it is considered to increase the opening amount of the throttle valve 36 thereby to increase the amount of intake air supplied to the combustion chamber 50 of the engine 10, while at the same time increasing the amount of fuel injected into the intake air passage 34.

If, however, the throttle opening amount is increased in a short period of time with the ignition timing retarded under the ignition retard control, the intake manifold pressure produced in the intake air passage 34 on the downstream side of the throttle valve 36, or in the surge tank 28, is rapidly reduced. As a result, a sufficiently large brake negative pressure $B_{VAC}$ may not be applied to the negative pressure chamber 22 of the brake booster 18. Consequently, a desired pressure difference may not be established between the variable pressure chamber 24 and the negative pressure chamber 22 of the brake booster 18 when the brake pedal 14 is depressed after the start of the engine, and a desired assist force to be added to the pedal pressing force may not be generated. Accordingly, when a sufficiently large brake negative pressure $B_{VAC}$ is not applied to the negative pressure chamber 22, it is not appropriate to increase the throttle opening amount in a short time with the ignition timing retarded under the ignition retard control.

The system according to the second embodiment is characterized in that a sufficiently large brake negative pressure $B_{VAC}$ is surely developed even when the ignition retard control is performed.

Figure 4A:
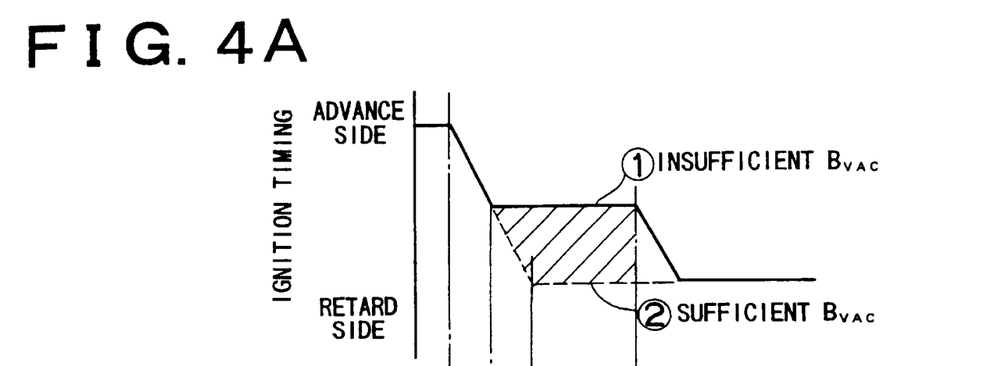
FIGS. 4A–4C explain the operation of the negative pressure control apparatus of the engine according to a second embodiment of the invention.
Figure 4B:
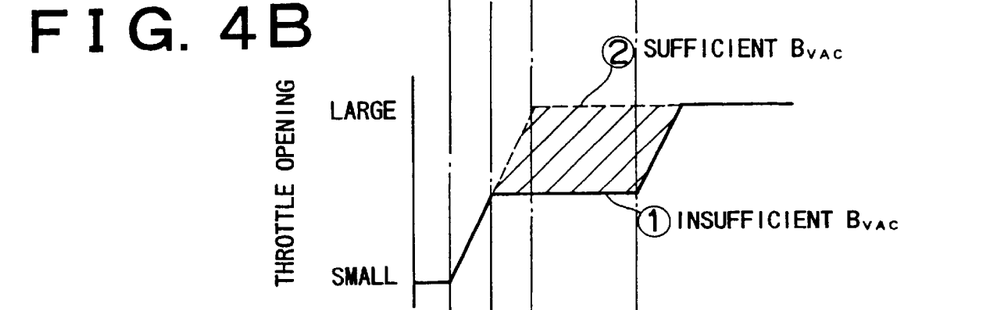
Figure 4C:
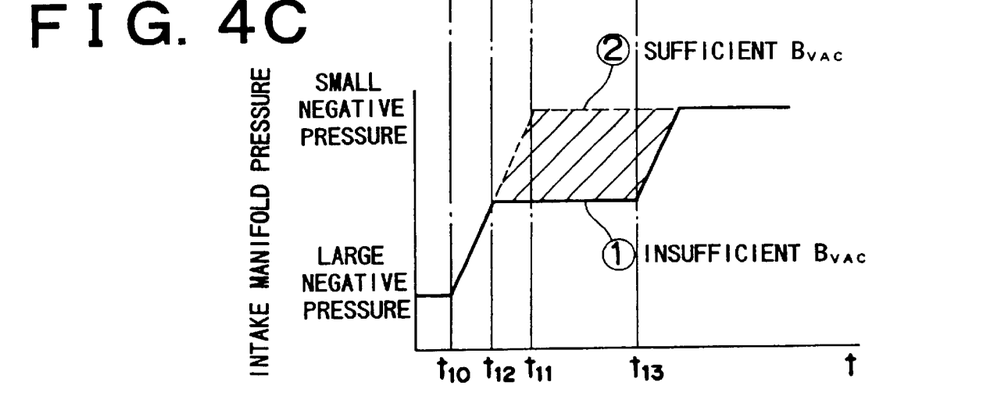

FIGS. 4A to 4C are diagrams for explaining the operation of the negative pressure control apparatus of the engine 10 according to the second embodiment of the invention. FIG. 4A shows changes in the ignition timing with time, FIG. 4B shows changes in the throttle opening θ with time, and FIG. 4C shows changes in the intake manifold pressure with time. In each of FIGS. 4A to 4C, a solid line indicates changes in each parameter (i.e., the ignition timing, the throttle opening, and the intake manifold pressure) with time when the brake negative pressure $B_{VAC}$ does not reach or is short of the desired value, and a broken line indicates changes in each parameter with time when the brake negative pressure $B_{VAC}$ reaches the required value, respectively.

As shown in FIG. 4A, at a point of time $t=t_{10}$ after the engine 10 is started, the ignition timing starts being retarded so as to accelerate warm-up of a catalyst, for example. If the brake negative pressure $B_{VAC}$ has reached the required value at this time, the ignition timing continues to be retarded until the ignition timing reaches the target timing ($t=t_{11}$ in FIG. 4A) as indicated by the broken line. Then, the ignition timing stops being retarded when the ignition timing reaches the target timing.

If, on the other hand, the brake negative pressure $B_{VAC}$ has not reached the required value at the point of time $t=t_{12}$, retarding of the ignition timing is interrupted when the ignition timing is retarded to a certain timing ($t=t_{12}$ in FIG. 4A) before the ignition retard control is completed, as shown in a solid line in FIG. 4A. If retarding of the ignition timing is interrupted before it is completed, the output of the engine 10 will not reduced any longer, and therefore the throttle opening θ will not be increased any longer as shown in FIG. 4B. In this case, the intake manifold pressure will not be changed to the smaller negative pressure side (i.e., the intake manifold pressure will not be increased), and thus a larger intake manifold pressure can be established as compared with the case where the throttle opening θ continues to be increased. This makes it possible to apply a sufficiently large brake negative pressure $B_{VAC}$ to the brake booster 18 when the brake negative pressure $B_{VAC}$ does not reach the required value. The retarding of the ignition timing is resumed or re-started when a predetermined time elapses (at $t=t_{13}$ in FIG. 4A) after the retarding of the ignition timing is interrupted.

Figure 5:
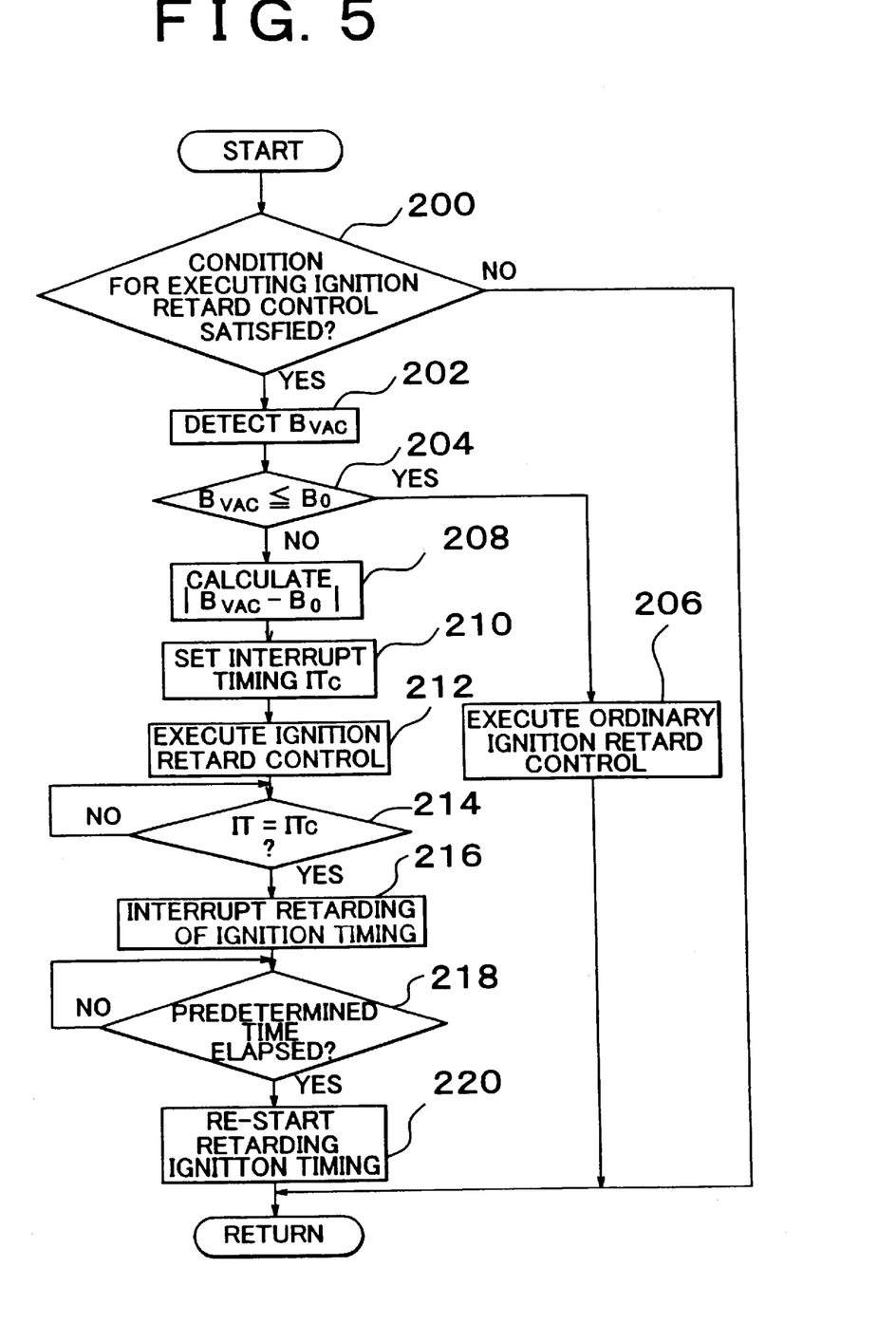
FIG. 5 is a flowchart showing a control routine executed by an ECU of the second embodiment.

FIG. 5 shows a flowchart of one example of a control routine executed by the ECU 12 in the second embodiment so as to accomplish the above-described functions. The routine as shown in FIG. 5 is started each time its process is finished. When the routine as shown in FIG. 5 is started, step 200 is initially executed.

In step 200, it is determined whether a condition or conditions for performing ignition retard control so as to accelerate warm-up of a catalyst, for example, is/are satisfied. For example, the condition(s) for performing ignition retard control may be satisfied when the temperature of the catalyst is equal to or lower than a predetermined value. If it is determined that the conditions for performing ignition retard control are not satisfied, the current cycle of the control routine is terminated with no further step being executed. If it is determined that the conditions for performing ignition retard control are satisfied, step 202 is then executed.

In step 202, the pressure applied to the negative pressure chamber 22 of the brake booster 18, namely, the brake negative pressure $B_{VAC}$, is detected based on an output signal of the pressure sensor 38.

In step 204, it is determined whether the brake negative pressure $B_{VAC}$ is less than or equal to a predetermined value Bo, as in step 104 of the routine shown in FIG. 3. If step 204 determines that $B_{VAC} \leq Bo$ is satisfied, step 206 is then executed. If $B_{VAC} \leq Bo$ is not satisfied, the control process then proceeds to step 208.

In step 206, the ignition retard control is performed according to the ordinary or normal procedures. Once step 206 is executed, the ignition timing is retarded, and at the same time the throttle opening θ is increased so as to compensate for a reduction in the output of the engine resulting from the retarded ignition timing. When the operation of step 206 is completed, the current cycle of the routine of FIG. 5 is terminated.

In step 208, a difference $|B_{VAC}-Bo|$ between the actual brake negative pressure $B_{VAC}$ and the target predetermined value Bo is calculated.

If this difference $|B_{VAC}-Bo|$ is small, it is possible to surely reduce the brake negative pressure down to the target predetermined value Bo even if the ignition timing changes on the timing advance side (i.e., if the timing retard routine is interrupted) only for a short period of time while the ignition timing is being retarded under ignition retard timing, namely, even if the throttle opening θ is kept small only for a short time. If, on the other hand, the difference $|B_{VAC}-Bo|$ is large, the brake negative pressure cannot be reduced down to the target predetermined value Bo unless the ignition timing changes on the timing advance side (i.e., if the timing retard routine is interrupted) for a relatively long period of time while the ignition timing is being retarded under ignition retard timing, namely, unless the throttle opening θ is kept small for relatively long time. In this respect, it is appropriate to change the ignition timing on the timing advance side while the ignition timing is being retarded under ignition retard timing, for a period of time that is determined depending upon the difference between the actual brake negative pressure $B_{VAC}$ and the target predetermined value Bo.

In step 210, a point of time ITc at which retarding of the ignition timing starts being interrupted is set to a value that is determined depending upon the difference $|B_{VAC}-Bo|$ calculated in step 208. More specifically, the point of time ITc at which the retarding of the ignition timing starts being interrupted (which will be hereinafter referred to as "interrupt timing ITc") is set to be an earlier point of time as the difference $|B_{VAC}-Bo|$ is greater, by referring to a certain map stored in memory of the ECU 12, for example.

In step 212, the ignition retard control is performed with the interrupt time ITc set in step 210 above taken into consideration.

In step 214, it is determined whether the ignition time (IT) has reached the interrupt timing ITc. Step 214 is repeatedly executed until IT becomes equal to ITc. When step 214 determines that IT=ITc is satisfied, the process then proceeds to step 216.

In step 216, the retarding of the ignition timing under the ignition retard control is interrupted. If step 216 is executed, the ignition timing is thereafter kept constant (rather than being retarded), and the throttle opening θ is kept at a constant value.

In step 218, it is determined whether a predetermined time has elapsed after retarding of the ignition timing was interrupted. If the predetermined time has elapsed, step 220 is then executed.

In step 220, retarding of the ignition timing is resumed or re-started. If step 220 is executed, the ignition retard control will be continued until retarding of the ignition timing is completed. When the operation of step 220 is finished, the current cycle of the control routine is terminated.

According to the control process as described above, if the brake negative pressure $B_{VAC}$ has not reached a level sufficient to allow the brake booster 18 to produce an assist force having a desired amplification ratio with respect to the pedal pressing force when the ignition retard control is performed upon a start of the engine 10, the ignition timing may be varied on the timing advance side of the ignition timing in the course of retarding the ignition timing under ignition retard control. More specifically, the interrupt timing, i.e., a point of time at which retarding of the ignition timing is interrupted, is set to a certain point prior to completion of the ignition retard control.

If retarding of the ignition timing under ignition retard control is interrupted before completion of the control, the output of the engine 10 is not further reduced, and the throttle opening θ stops being increased. In this case, a large intake manifold pressure is produced in the intake air passage 34 on the downstream side of the throttle valve 36, as compared with the case where the throttle opening θ continues to be increased. According to this embodiment, therefore, the brake negative pressure $B_{VAC}$ can be increased immediately after the engine 10 is started even if the brake negative pressure $B_{VAC}$ would be insufficient when the ignition retard control is performed for retarding the ignition timing. Thus, the second embodiment makes it possible to appropriately operate the brake booster 18 so as to boost or amplify the pedal pressing force (i.e., the force applied to the brake pedal 14) even when ignition retard control is performed.

According to the control process as described above, the interrupt timing in which the process of retarding the ignition timing under ignition retard control is interrupted (namely, a point of time at which the ignition timing stops being retarded) can be changed depending upon the deviation (or the amount of shortage) of the brake negative pressure $B_{VAC}$ from the target value Bo. More specifically, as the deviation of the bake negative pressure $B_{VAC}$ from the target value is greater, the interrupt timing of the ignition retard control is advanced, namely, the ignition retard control is interrupted at an early point of time during the retarding process. If the interrupt timing of the ignition retard control is thus set to a point on the timing advance side of the ignition timing, the period of time in which the throttle opening θ is kept small is accordingly prolonged. According to this embodiment, therefore, an intake manifold pressure corresponding to the amount of shortage of the brake negative pressure $B_{VAC}$ can be introduced to the negative pressure chamber 22 of the brake booster 18. Thus, the second embodiment makes it possible to ensure a sufficiently large negative pressure in the brake booster 18 even when the brake negative pressure $B_{VAC}$ is largely short of the target value.

In the second embodiment, the interrupt timing in which retarding of the ignition timing under ignition retard control is interrupted is changed depending upon the deviation of the actual brake negative pressure $B_{VAC}$ from the target predetermined value Bo. The invention, however, is not limited to this arrangement. For example, the slope of change of the ignition timing toward the most retarded state after the ignition retard control is started, namely, the period of time between the start and the end of the ignition retard control, may be changed depending upon the deviation of the actual brake negative pressure $B_{VAC}$ from the target predetermined value Bo. In this case, if the period of time between the start and the end of the ignition retard control is increased as the above deviation is greater, the period of time in which the throttle opening θ is kept small can be made longer, thus assuring that a sufficiently large negative pressure is applied to the brake booster 18 without fail.

While retarding of the ignition timing under ignition retard control is interrupted only once during the retarding process in the second embodiment, the retarding may be interrupted a plurality of times in multiple steps during the process.

Figure 6:
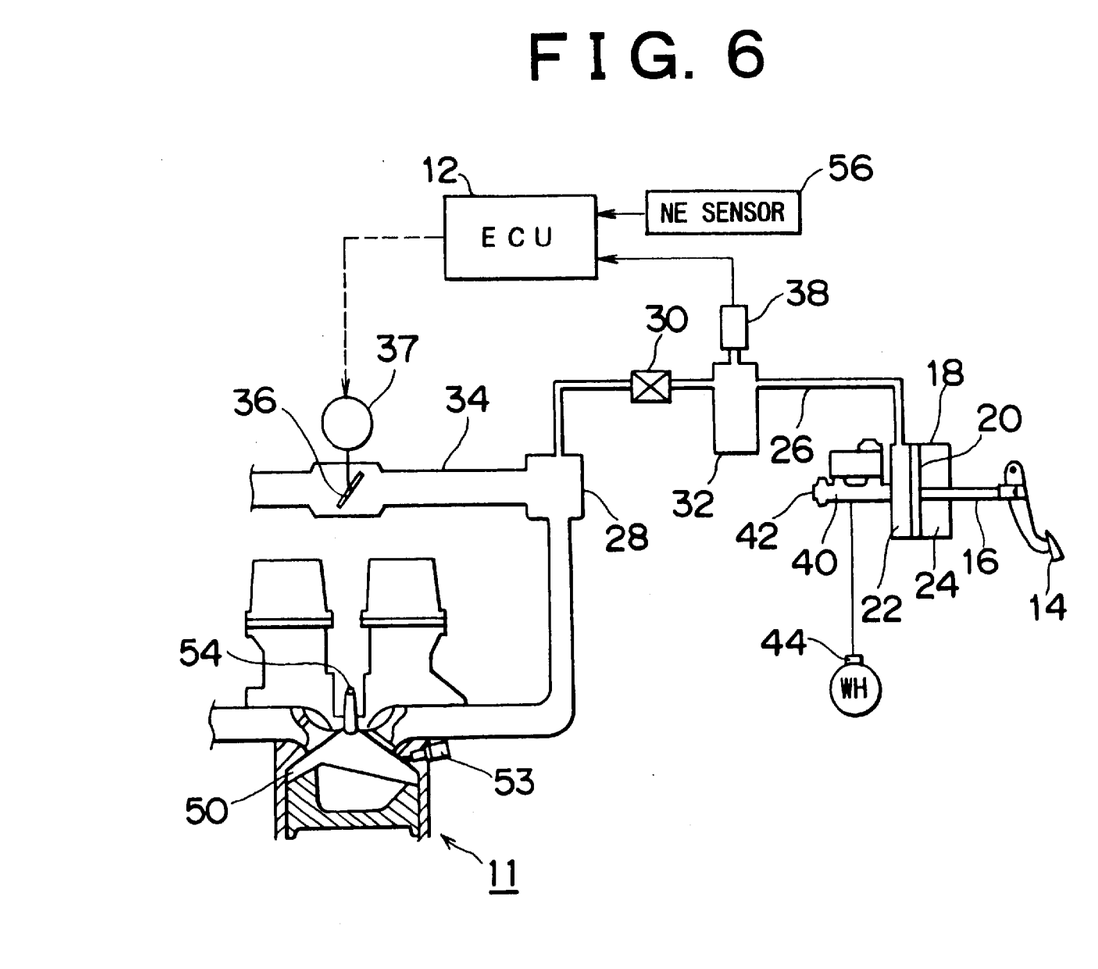
FIG. 6 is a view showing a system of a negative pressure control apparatus of an internal combustion engine according to another embodiment of the invention.

In the first and second embodiments as described above, the invention is applied to the internal combustion engine in which the injector 52 is disposed near an end portion of the intake air passage 34 on the side of the combustion chamber 50, and fuel is injected from the injector 52 into an intake port that is open or closed by an intake valve. However, the invention is equally applicable to other types of internal combustion engines, such as direct injection type spark ignition internal combustion engines, one example of which is illustrated in FIG. 6. The internal combustion engine 11 as shown in FIG. 6 is different from that of FIG. 1 only in that a fuel injector 53 is disposed at an outer peripheral portion of the combustion chamber 50 such that fuel is injected by the fuel injector 53 directly into the combustion chamber 50. When the direct injection type engine 11 is in a fast idle state for effecting catalyst warm-up control, fuel is injected directly into a combustion chamber during a compression stroke while the ignition timing is greatly retarded as compared with that of the engine as shown in FIG. 1, so that the engine 11 performs stratified charge combustion. In this direct injection type engine 11 in which the fuel can be injected during the compression stroke, the timing of formation of an air/fuel mixture can be greatly delayed as compared with that of the engine as shown in FIG. 1 in which the fuel and the air is pre-mixed before combustion. Accordingly, the ignition timing can also be greatly delayed, thereby assuring a significantly enhanced catalyst warm-up effect.

When the direct injection type engine 11 as shown in FIG. 6 performs stratified charge combustion through fuel injection during the compression stroke, the greatly retarded ignition timing may cause a reduction in the engine torque, which may result in unstable idling or unstable combustion. In view of this, the opening amount of the throttle valve 36 is increased so as to increase the intake air amount, depending upon the retard amount of the ignition timing. In fact, the throttle valve 36 may be driven close to the fully open position. In this case, the magnitude of the negative pressure produced on the downstream side of the throttle valve 36 is reduced, resulting in a lack of negative pressure applied to the brake booster. Hence, the negative pressure control as described above in the first and second embodiments can be advantageously performed with respect to the direct injection type internal combustion engine.

In the illustrated embodiment, the controller (the ECU 12) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An apparatus for controlling a negative pressure in an internal combustion engine, comprising:
    a brake booster that amplifies a pedal pressing force that is applied to a brake pedal, the brake booster using the negative pressure produced on a downstream side of a throttle valve provided in an intake passage of the internal combustion engine, as a power source for amplifying the pedal pressing force; and
    a controller that:
        determines whether the negative pressure applied to the brake booster has reached a predetermined level when the internal combustion engine is started; and
        if the negative pressure applied to the brake booster has not reached the predetermined level, increases an operating speed of the internal combustion engine to a predetermined high speed, and then keeps the throttle valve in a small opening state in which an opening amount of the throttle valve is smaller than that established when the internal combustion engine is in a fast idle state, during a period of time in which the internal combustion engine proceeds to a steady-state operating mode in which the internal combustion engine operates at a predetermined speed that is less than the predetermined high speed.

2. The apparatus according to claim 1, wherein the controller keeps the throttle valve in a fully closed position during the period of time in which the internal combustion engine proceeds to the steady-state operating mode.

3. The apparatus according to claim 1, wherein the controller keeps the opening amount of the throttle valve substantially equal to a throttle opening established during normal idling of the internal combustion engine, during the period of time in which the internal combustion engine proceeds to the steady-state operating mode.

4. The apparatus according to claim 1, wherein the controller changes the period of time in which the throttle valve is kept in the small opening state, depending upon a pressure difference between the negative pressure applied to the brake booster and the predetermined level.

5. The apparatus according to claim 1, wherein the controller changes the predetermined high speed to which the operating speed of the internal combustion engine is increased, depending upon a pressure difference between the negative pressure applied to the brake booster and the predetermined level.

6. The apparatus according to claim 1, wherein the predetermined speed is a fast idle speed.

7. An apparatus for controlling a negative pressure in an internal combustion engine, comprising:

a brake booster that amplifies a pedal pressing force that is applied to a brake pedal, the brake booster using the negative pressure produced on a downstream side of a throttle valve provided in an intake passage of the internal combustion engine, as a power source for amplifying the pedal pressing force; and a controller that:

performs ignition retard control so as to retard an ignition timing to a predetermined timing during fast idling of the internal combustion engine;

increases an opening amount of the throttle valve as the ignition timing is retarded during the ignition retard control; and during at least a part of a process of the ignition retard control, control the ignition timing to be more advanced when the negative pressure applied to the brake booster is less than a predetermined level, than the ignition timing established when the negative pressure applied to the brake booster reaches the predetermined level.

8. The apparatus according to claim 7, wherein the controller interrupts the ignition retard control before the ignition timing is retarded to the predetermined timing when the negative pressure that is applied to the brake booster is less than the predetermined level.

9. The apparatus according to claim 8, wherein the controller determines when to interrupt the ignition retard control depending upon a pressure difference between the negative pressure applied to the brake booster and the predetermined level.

10. An apparatus for controlling a negative pressure in an internal combustion engine, comprising:

a brake booster that amplifies a pedal pressing force that is applied to a brake pedal, the brake booster using the negative pressure produced on a downstream side of a throttle valve provided in an intake passage of the internal combustion engine, as a power source for amplifying the pedal pressing force; and a controller that:

performs ignition retard control so as to retard an ignition timing to a predetermined timing during fast idling of the internal combustion engine;

increases an opening of a throttle valve as the ignition timing is retarded during the ignition retard control; and changes a period of time that elapses between a start of the ignition retard control and a time when the ignition timing reaches the predetermined timing, so that the period of time increases when the negative pressure that is applied to the brake booster is less than a predetermined level.

11. The apparatus according to claim 10, wherein the controller changes the period of time depending upon a pressure difference between the negative pressure applied to the brake booster and the predetermined level.

12. An apparatus for controlling a negative pressure in an internal combustion engine, comprising:

a brake booster that amplifies a pedal pressing force that is applied to a brake pedal, the brake booster using the negative pressure produced on a downstream side of a throttle valve provided in an intake passage of the internal combustion engine, as a power source for amplifying the pedal pressing force; and a controller that:

determines whether a condition for executing catalyst warm-up control during or after a start of the internal combustion engine is satisfied when the internal combustion engine is started; and if the condition is satisfied, increases an operating speed of the internal combustion engine to a predetermined high speed, and then keeps the throttle valve in a small opening state in which an opening amount of the throttle valve is smaller than that established when the internal combustion engine is in a fast idle state, during a period of time in which the internal combustion engine proceeds to a steady-state operating mode in which the internal combustion engine operates at a predetermined speed that is less than the predetermined high speed.

13. The apparatus according to claim 12, wherein the controller keeps the throttle valve in a fully closed position during the period of time in which the internal combustion engine proceeds to the steady-state operating mode.

14. The apparatus according to claim 12, wherein the controller keeps the opening amount of the throttle valve substantially equal to a throttle opening established during normal idling of the internal combustion engine, during the period of time in which the internal combustion engine proceeds to the steady-state operating mode.

15. The apparatus according to claim 12, wherein the predetermined high speed is higher than a fast idle speed.

16. The apparatus according to claim 12, wherein the predetermined high speed is determined depending upon the negative pressure applied to the brake booster at the time of the start of the internal combustion engine.

17. The apparatus according to claim 12, wherein the predetermined speed is a fast idle speed.

18. A method for controlling a negative pressure in an internal combustion engine that has a brake booster that amplifies a pedal pressing force that is applied to a brake pedal, the brake booster using the negative pressure produced on a downstream side of a throttle valve provided in an intake passage of the internal combustion engine, as a power source for amplifying the pedal pressing force, the method comprising:

determining whether the negative pressure applied to the brake booster has reached a predetermined level when the internal combustion engine is started; and if the negative pressure applied to the brake booster has not reached the predetermined level, increasing an operating speed of the engine to a predetermined high speed, and then keeping the throttle valve in a small opening state in which an opening amount of the throttle valve is smaller than that established when the internal combustion engine is in a fast idle state, during a period of time in which the internal combustion engine proceeds to a steady-state operating mode in which the internal combustion engine operates at a predetermined speed that is less than the predetermined high speed.

19. The method according to claim 18, wherein the throttle valve is kept in a fully closed position during the period of time in which the internal combustion engine proceeds to the steady-state operating mode.

20. The method according to claim 18, wherein the opening amount of the throttle valve is kept substantially equal to a throttle opening established during normal idling of the internal combustion engine, during the period of time in which the internal combustion engine proceeds to the steady-state operating mode.

21. The method according to claim 18, wherein the period of time in which the throttle valve is kept in the small opening state, depending upon a pressure difference between the negative pressure applied to the brake booster and the predetermined level.

22. The method according to claim 18, wherein the predetermined high speed to which the operating speed of the internal combustion engine is increased is changed depending upon a pressure difference between the negative pressure applied to the brake booster and the predetermined level.

23. The method according to claim 18, wherein the predetermined speed is a fast idle speed.

24. A method for controlling a negative pressure in an internal combustion engine that has a brake booster that amplifies a pedal pressing force that is applied to a brake pedal, the brake booster using the negative pressure produced on a downstream side of a throttle valve provided in an intake passage of the internal combustion engine, as a power source for amplifying the pedal pressing force, the method comprising:

performing ignition retard control so as to retard an ignition timing to a predetermined timing during fast idling of the internal combustion engine;

increasing an opening amount of a throttle valve as the ignition timing is retarded during the ignition retard control; and during at least a part of a process of the ignition retard control, controlling the ignition timing to be more advanced when the negative pressure applied to the brake booster is less than a predetermined level, than the ignition timing established when the negative pressure applied to the brake booster reaches the predetermined level.

25. The apparatus according to claim 24, wherein the step of controlling the ignition timing comprises a step of interrupting the ignition retard control before the ignition timing is retarded to the predetermined timing when the negative pressure that is applied to the brake booster is less than the predetermined level.

26. The method according to claim 25, wherein the interrupting step includes determining when to interrupt the ignition retard control depending upon a pressure difference between the negative pressure applied to the brake booster and the predetermined level.

27. A method for controlling a negative pressure in an internal combustion engine that has a brake booster that amplifies a pedal pressing force that is applied to a brake pedal, the brake booster using the negative pressure produced on a downstream side of a throttle valve provided in an intake passage of the internal combustion engine, as a power source for amplifying the pedal pressing force, the method comprising:

performing ignition retard control so as to retard an ignition timing to a predetermined timing during fast idling of the internal combustion engine;

increasing an opening of the throttle valve as the ignition timing is retarded during the ignition retard control; and changing a period of time that elapses between a start of the ignition retard control and a time when the ignition timing reaches the predetermined timing, so that the period of time increases when the negative pressure that is applied to the brake booster is less than a predetermined level.

28. The method according to claim 27, wherein the changing step includes changing the period of time depending upon a pressure difference between the negative pressure applied to the brake booster and the predetermined level.

29. A method for controlling a negative pressure in an internal combustion engine that has a brake booster that amplifies a pedal pressing force that is applied to a brake pedal, the brake booster using the negative pressure produced on a downstream side of a throttle valve provided in an intake passage of the internal combustion engine, as a power source for amplifying the pedal pressing force, the method comprising:

determining whether a condition for executing catalyst warm-up control during or after a start of the internal combustion engine is satisfied when the engine is started; and if the condition is satisfied, increasing an operating speed of the internal combustion engine to a predetermined high speed, and then keeping the throttle valve in a small opening state in which an opening amount of the throttle valve is smaller than that established when the internal combustion engine is in a fast idle state, during a period of time in which the internal combustion engine proceeds to a steady-state operating mode in which the internal combustion engine operates at a predetermined speed that is less than the predetermined high speed.

30. The method according to claim 29, wherein the throttle valve is kept in a fully closed position during the period of time in which the internal combustion engine proceeds to the steady-state operating mode.

31. The method according to claim 29, wherein the opening amount of the throttle valve is kept substantially equal to a throttle opening established during normal idling of the internal combustion engine, during the period of time in which the internal combustion engine proceeds to the steady-state operating mode.

32. The method according to claim 29, wherein the predetermined high speed is higher than a fast idle speed.

33. The method according to claim 29, wherein the predetermined high speed is determined depending upon the negative pressure applied to the brake booster at the time of the start of the internal combustion engine.

34. The method according to claim 29, wherein the predetermined speed is a fast idle speed.

* * * * *